(12) United States Patent
Chaganti (10) Patent No.: US 9,253,037 B2
(45) Date of Patent: *Feb. 2, 2016

(54) VIRTUALIZATION SYSTEM PROVISION

(71) Applicant: Dell Products L.P., Round Rock, TX (US)

(72) Inventor: Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,210

(22) Filed: Nov. 25, 2014

(65) Prior Publication Data

US 2015/0195132 A1 Jul. 9, 2015

Related U.S. Application Data

(63) Continuation of application No. 12/351,347, filed on Jan. 9, 2009, now Pat. No. 8,904,376.

(51) Int. Cl.
*G06F 9/445* (2006.01)
*G06F 15/177* (2006.01)
*H04L 12/24* (2006.01)
*G06F 9/50* (2006.01)
*G06F 9/455* (2006.01)

(52) U.S. Cl.
CPC ............ *H04L 41/0806* (2013.01); *G06F 8/61* (2013.01); *G06F 9/44505* (2013.01); *G06F 9/45558* (2013.01); *G06F 9/5077* (2013.01); *G06F 15/177* (2013.01); *G06F 2009/45575* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 5,852,722 | A | 12/1998 | Hamilton |
| 6,714,937 | B1 | 3/2004 | Eynon et al. |
| 6,760,708 | B1 | 7/2004 | Hubbard et al. |
| 6,834,299 | B1 * | 12/2004 | Hamilton, II ........... H04L 29/06 370/411 |

(Continued)

OTHER PUBLICATIONS

VMware, VMware Infrastructure 3 Comprehensive Evaluator's Guide [online], 2007 [retrieved Sep. 15, 2015], Retrieved from Internet: <URL: https://web.archive.org/web/20090306204705/http://www.vmware.com/files/pdf/VI3_Comprehensive_Evaluator_Guide.pdf>, whole document.*

(Continued)

*Primary Examiner* — Todd Aguilera
(74) *Attorney, Agent, or Firm* — Haynes and Boone, LLP (57) ABSTRACT

A method for providing a virtualization system includes receiving a plurality of virtualization system requirements from a customer that include a plurality of information handling systems (IHSs), at least one storage, and a plurality of configuration details. A primary IHS and a secondary IHS are designated, and configuration data, an application interface, and a primary IHS operating system are provided on the primary IHS. Following physical connection of the plurality of the IHSs and in response to activation of the primary IHS, a primary IHS first boot process initiates the application interface that then automatically activates the secondary IHS and uses the configuration data to automatically configure the at least one storage. In response to activation of the secondary IHS, a secondary IHS operating system on the secondary IHS initiates a secondary IHS first boot process that automatically configures virtualization software installed on the secondary IHS.

20 Claims, 4 Drawing Sheets

(56) References Cited

U.S. PATENT DOCUMENTS

| | | | |
|---|---|---|---|
| 6,880,752 B2 | 4/2005 | Tarnovsky et al. | |
| 6,934,799 B2 | 8/2005 | Achurya et al. | |
| 7,107,443 B2 * | 9/2006 | Rhoades | G06F 15/177 713/1 |
| 7,577,722 B1 | 8/2009 | Khandekar et al. | |
| 7,603,446 B2 | 10/2009 | Brisse | |
| 7,657,615 B1 | 2/2010 | Patterson et al. | |
| 7,987,211 B2 | 7/2011 | Johnson et al. | |
| 8,032,739 B2 | 10/2011 | Ramos et al. | |
| 8,041,793 B2 | 10/2011 | Chawla et al. | |
| 8,171,485 B2 | 5/2012 | Muller | |
| 2003/0200149 A1 | 10/2003 | Gonzalez et al. | |
| 2005/0198631 A1 | 9/2005 | Bisher et al. | |
| 2005/0203756 A1 | 9/2005 | Pirich et al. | |
| 2006/0277340 A1 | 12/2006 | Mar | |
| 2007/0164105 A1 | 7/2007 | Tolliver et al. | |
| 2007/0192466 A1 * | 8/2007 | Nahum | G06F 9/4416 709/223 |
| 2007/0268516 A1 * | 11/2007 | Bugwadia | H04L 67/34 358/1.15 |
| 2008/0052707 A1 | 2/2008 | Wassel et al. | |
| 2008/0155223 A1 | 6/2008 | Hiltgen et al. | |
| 2009/0164528 A1 | 6/2009 | Robertson et al. | |
| 2009/0199177 A1 | 8/2009 | Edwards et al. | |
| 2009/0300607 A1 | 12/2009 | Ferris et al. | |
| 2010/0180107 A1 | 7/2010 | Chaganti et al. | |
| 2010/0180272 A1 | 7/2010 | Kettler et al. | |

OTHER PUBLICATIONS

Grehant X., et al., "Providing Virtual Execution Environments: A Twofold Illustration," CERN Openlab [online], 2007 [retrieved Sep. 16, 2015], Retrieved from Internet: <URL: http://citeseerx.ist.psu.edu/viewdoc/download?doi=10.1.1.313.7243&rep=rep1&type=pdf>, pp. 1-12.*

J. Echols, "The New, Improved PowerVault SAN Configuration Tool" Dell [online], 2001 [retrieved Jul. 17, 2014], retrieved from Internet: <URL: http://www.dell.com/content/topics/global.aspx/power/en/ps2g01_echols?c=us&l=en>, pp. 1-5.

* cited by examiner

Internet Browser

File  Edit  View  Favorites  Tools  Help

Back ▼ | ⇧ | ▼ | ✕ | ⌂ | 🔍 Search | ☆ Favorites |

Address: http://www.sampleinternetpage.patent.com/embodiment ▼ | Links ▼ | Search Bar [        ] ▼ | ○ Settings ▶

302b — What type of server do you prefer?          What is the goal of final processor utilization? — 302e
302ba — ○ Rack Servers (2 Sockets)           302ea — ○ Low
302bb — ○ Rack Servers (4 Sockets)           302eb — ○ Medium
302bc — ○ Blade Servers                      302ec — ○ High
302bd — ○ Tower Servers
                                             For consolidating existing workload, please provide the following:    302f
302c — What type of storage do you need?
302ca — ○ Local Storage (Storage available in each server)   302fa — [  ] Total Number of Servers?
302cb — ○ Fiber Channel Storage Area Network                 302fb — [  ] Total Memory in all Servers (GB)?
                                                             302fc — [  ] Average Network Bandwidth Utilization per server (Mbps)?
302cc — ○ Blade Servers                                      302fd — [  ] Total Disk capacity in all servers (GB)?
302cd — ○ iSCSI Storage Area Network                         302fe — [  ] Average Disk IOPS per server?
                                                             302ff — [  ] Total Number of PIII Processors
302d — Do you need a tape backup solution?                   302fg — [  ] Total Number of Xeon Processors
302da — ○ No                                                 302fh — [  ] Average processor Utilization?
302db — ○ Yes                                                302fi — [  ] Average Frequency of PIII Processors (GHz)?
302dc — ○ Yes with LAN-free VMware Consolidated Backup       302fj — [  ] Average Frequency of Xeon Processors (GHz)?

VIRTUALIZATION SYSTEM PROVISION

CROSS REFERENCE TO RELATED APPLICATIONS

This application is a continuation application of U.S. application Ser. No. 12/351,347, which was filed on Jan. 9, 2009, the entire disclosure of which is incorporated herein by reference.

BACKGROUND

The present disclosure relates generally to information handling systems, and more particularly to the provision of a virtualization system on a plurality of information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some consumers may utilize an IHS or a plurality of IHSs to create virtualization systems that may include a virtual IHS and/or a plurality of virtual IHSs, some of which may be identical to each other with regard to, for example, virtual hardware and/or software on the virtual IHSs, and some of which may be different from each other with regard to, for example, virtual hardware and/or software on the virtual IHSs. A virtual IHS is a software implementation of a physical IHS that executes programs like the physical IHS. For example, a virtualization layer may be installed on an IHS or a plurality of IHSs that allows multiple operating systems to run concurrently within virtual IHSs on the IHS or IHSs, dynamically partitioning and sharing the available physical resources of the IHS or IHSs such as, for example, the central processing unit (CPU), storage, memory, input and output (I/O) devices, and/or a variety of other resources known in the art. While the virtual IHSs may run on an single IHS, they behave as though they were separate IHSs. A plurality of virtual IHSs may be different from each other with regard to operating system configuration information such as, for example, IHS name, user accounts, network settings, etc., even though the plurality of virtual IHSs are identical in every other respect. The provision of these virtualization systems raises a number of issues.

Typically, a customer who orders a virtualization system from an IHS manufacturer is required to set up the virtualization system themselves. For example, the customer who orders the hardware and software for the virtualization system may need to physically connect all of the components of the virtualization system, configure the storage arrays, create Logical Unit Numbers (LUNs) on the storage arrays, configure the virtualization software, and perform a plurality of other tasks known in the art for setting up a virtualization system. Such actions require the customer either possess significant knowledge of the various hardware and software components involved in the virtualization system, or pay the manufacturer or some other third party to physically set up the virtualization system.

Accordingly, it would be desirable to provide for improved virtualization system provision absent the disadvantages discussed above.

SUMMARY

According to one embodiment, a method for providing a virtualization system includes receiving a plurality of virtualization system requirements from a customer, wherein the plurality of virtualization system requirements comprise a plurality of IHSs, at least one storage, and a plurality of configuration details; designating a primary IHS and at least one secondary IHS from the plurality of IHSs; providing configuration data, an application interface, and a primary IHS operating system on the primary IHS, wherein the application interface is operable to use the configuration data to configure the at least one storage, and wherein the primary IHS operating system comprises a primary IHS first boot process that is operable to invoke the application interface and activate the at least one secondary IHS; and installing virtualization software and a secondary IHS operating system on the at least one secondary IHS, wherein the secondary IHS operating system comprises a secondary IHS first boot process that is operable to configure the virtualization software.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a CPU or hardware or software control logic. Additional components of the IHS may include one or more storage devices, one or more communications ports for communicating with external devices as well as various I/O devices, such as a keyboard, a mouse, and a video display. The IHS may also include one or more buses operable to transmit communications between the various hardware components.

Figure 1:
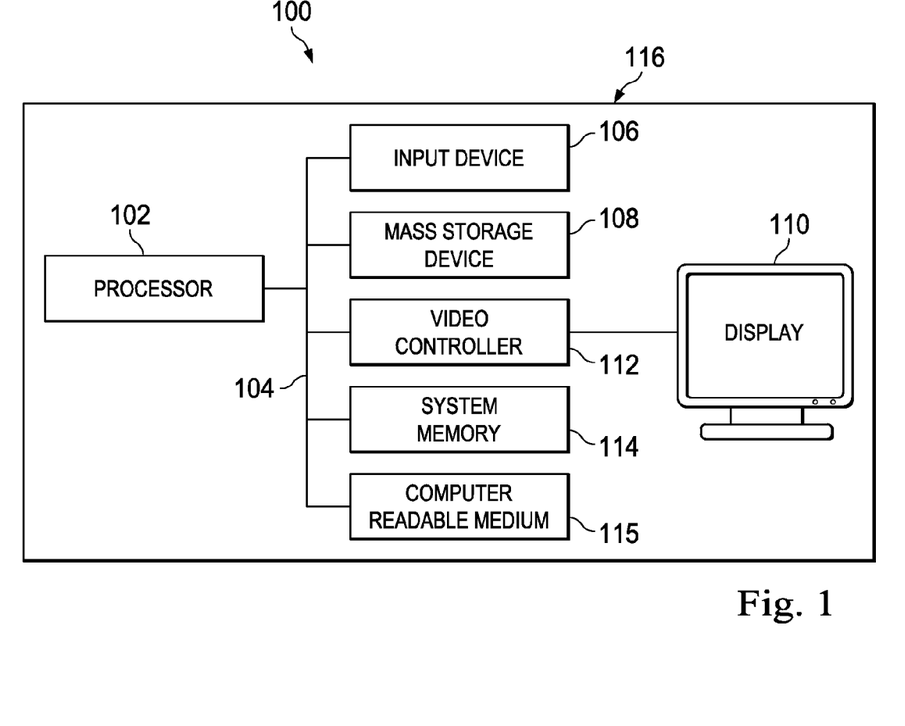
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. A computer-readable medium 115 is coupled to the processor 102 and may include the mass storage device 108, the system memory 114, and/or a variety of other computer-readable mediums known in the art. The computer-readable medium 115 stores (e.g., encodes, records, or embodies) computer-executable instructions/functional descriptive material (e.g., including but not limited to software (also referred to as computer programs or applications) or data structures). Such functional descriptive material imparts functionality when encoded on the computer-readable medium 115. For example, the processor 102 may read (e.g., access or copy) such functional descriptive material from the computer-readable medium 115 onto the system memory 114, and the processor 102 may then perform operations in response to such material. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
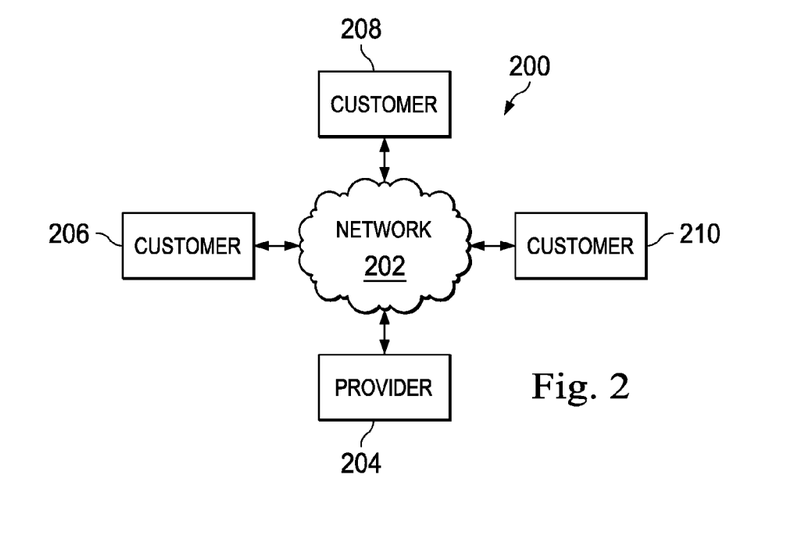
FIG. 2 is a schematic view illustrating an embodiment of a network including a provider and a plurality of customers.

Referring now to FIG. 2, in one embodiment, a portion of a virtualization provision system 200 is illustrated. The system 200 includes a network 202 such as, for example, a Transport Control Protocol/Internet Protocol (TCP/IP) network (e.g., the Internet or an intranet). A provider 204 is operably coupled to the network 202. A plurality of customers 206, 208 and 210 are also operably coupled to the network 202 in order to allow communication between the customers 206, 208 and 210 and the provider 204. Each of the provider 204 and the customers 206, 208 and 210 includes a respective network interface for communicating with the network 202 (e.g., outputting information to, and receiving information from, the network 202), such as by transferring information (e.g., instructions, data, signals) between such customers and the network 202. Accordingly, through the network 202, the provider 204 communicates with the customers 206, 208 and 210, and the customers 206, 208 and 210 communicate with the provider 204. In the discussion below, the customer 206 is a representative one of the customers 206, 208 and 210.

Figure 3A:
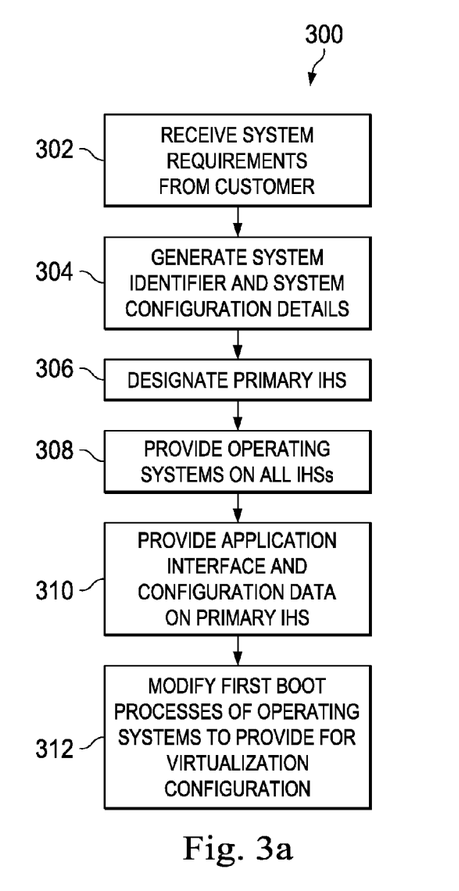
FIG. 3a is a flow chart illustrating an embodiment of a method for providing a virtualization system.
Figure 3B:
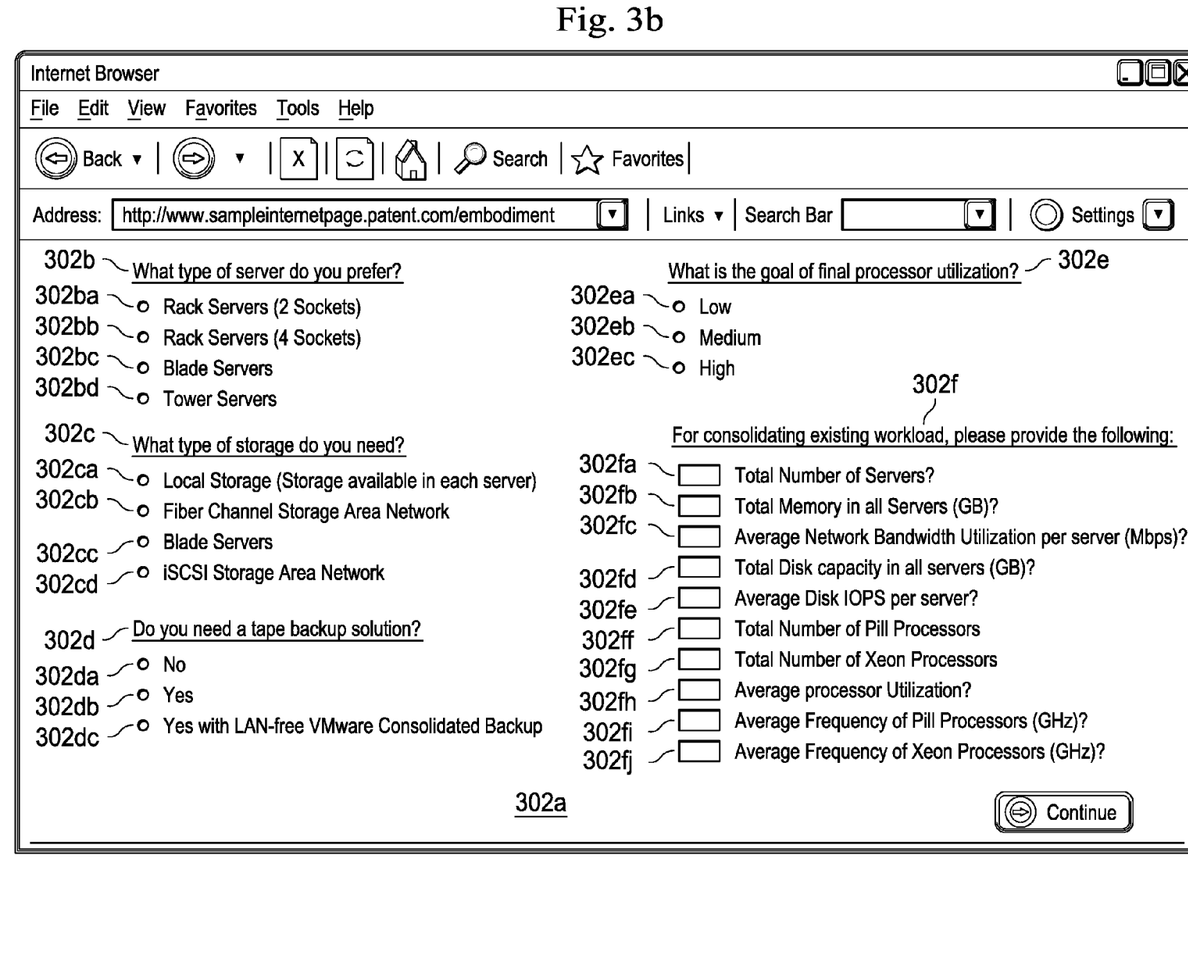
FIG. 3b is a screenshot illustrating an embodiment of a webpage for receiving virtualization system requirements from a customer.

Referring now to FIGS. 2, 3a and 3b, a method 300 for providing a virtualization system is illustrated. The method 300 begins at block 302 where a plurality of virtualization system requirements are received from a customer. In an embodiment, the provider 204 communicates with the customer 206 through the network 202 by providing a website that includes at least one webpage 302a. The at least one webpage 302a may include a plurality of questions, selection boxes, and/or input boxes to allow the customer 206 to select the plurality of virtualization system requirements for a desired virtualization system. For example, the webpage 302a includes a Type Of Server question 302b having a 2 Socket Rack Server selection box 302ba, a 4 Socket Rack Server selection box 302bb, a Blade Server selection box 302bc, and a Tower Server selection box 302bd that allow the customer 206 to select a type of server/IHS for the virtualization system. The webpage 302a also includes a Type Of Storage question 302c having a Local Channel selection box 302ca, a Fibre Channel Storage Area Network selection box 302cb, a Blade Server selection box 302cc, and a iSCSI Storage Area Network selection box 302cd that allow the customer 206 to select a type of storage for the virtualization system. The webpage 302a also includes a Tape Backup Solution question 302d having a No selection box 302da, a Yes selection box 302db, and a Yes with LAN-Free VMware Consolidated Backup selection box 302dc that allow the customer 206 to select or reject a tape backup solution for the virtualization system. The webpage 302a also includes a Goal Of Final Processor Utilization question 302e having a Low selection box 302ea, a Medium selection box 302eb, and a High selection box 302ec that allow the customer 206 to select a goal of the final processor utilization for the virtualization system. The webpage 302a also includes a Workload Consolidation section 302f having a Total Number Of Servers input box 302fa, a Total Memory In All Servers input box 302fb, an Average Network Bandwidth Utilization Per Server input box 302fc, a Total Disk Capacity In All Servers input box 302fd, an Average Disk TOPS Per Server input box 302fe, a Total Number Of Pill Processors input box 302ff, a Total Number Of Xeon Processors input box 302fg, an Average Processor Utilization input box 302fh, an Average Frequency Of Pill Processors input box 302fi, and an Average Frequency Of Xeon Processors input box 302fj that allow the customer 206 to input information to consolidate the workload for the virtualization system. The customer 206 may then continue through the website to provide additional information and/or confirm the selections made for the virtualization system so that those selections are sent to and received by the provider 204. While a plurality of questions, selection boxes, and input boxes have been described, one of skill in the art will recognize that a variety of other questions, selection boxes, and input boxes fall within the scope of the present disclosure and may be provided to request virtualization system information about the desired virtualization system from the customer 206 such that the virtualization system information may be received by the provider 204. Furthermore, one of skill in the art will recognize that the website having webpage 302a is but one embodiment that may be used to request and receive the virtualization system information from the customer 206, and that other methods may be used to request and receive the virtualization system information such as, for example, requesting the information in-person, over the phone, by fax, and/or using a variety of other methods known in the art.

The method 300 then proceeds to block 304 where a system identifier and system configuration details are generated. Upon receiving the selections made by the customer 206 in block 302 of the method 300, a system identifier is generated for the virtualization system that identifies, for example, the customer, the virtualization system, and/or a variety of other information related to the transaction. Furthermore, the selections made by the customer 206 in block 302 of the method 300 are used to generate a plurality of virtualization system configuration details such as, for example, a number of physical servers, a number of virtual machine (VM) containers per server, a number of storage arrays, a type(s) of storage arrays, a tape backup solution, a total memory in all servers, an average bandwidth utilization per server, a total disk capacity in all servers, a total number of processors, a type(s) of processor, an average processor utilization, an average frequency of processors, and/or a variety of other virtualization system configuration details known in the art. The configuration details are used to generate configuration data that may be used to provide an automated setup of the virtualization system, as will be described in more detail below. In response to the virtualization configuration details being generated, the provider 204 may manufacture a plurality of physical IHSs that include hardware, storage, software, and a variety of other components known in the art, that correspond to the configuration details generated from the selections made by the customer 206 in block 302 of the method 300. In an embodiment, rather than manufacturing the plurality of physical IHSs, the provider 204 may acquire the plurality of physical IHSs from, for example, a third party, the customer 206, a stock of previously manufactured physical IHSs belonging to the provide 204, and/or a variety of other sources known in the art. In an embodiment, each of the plurality of physical IHSs may be, for example, the IHS 100 described above with reference to FIG. 1.

The method 300 then proceeds to block 306 where a primary IHS is designated. From the plurality of physical IHSs manufactured or acquired in block 304 of the method 300, a primary IHS is designated such that the primary IHS and at least one secondary IHS are included in the plurality of physical IHSs. In an embodiment, the primary IHS may include, for example, a remote access controller, a managed systems services repository, and or a variety of other components known in the art. In an embodiment, the at least one secondary IHS may include, for example, a remote access controller, a managed systems services repository, and or a variety of other components known in the art. The method 300 then proceeds to block 308 where operating systems are provided on each of the plurality of physical IHSs. A primary IHS operating system is provided on the primary IHS and a secondary IHS operating system is provided on the at least one secondary IHS. In an embodiment, a variety of different virtualization software may be provided on the primary and/or at least one secondary IHSs.

The method 300 then proceeds to block 310 where an application interface and configuration data are provided on the primary IHS. An application interface that is operable to provide automated setup of the virtualization system, as described in further detail below, may be provided, for example, on the managed systems service repository on the primary IHS. The configuration data generated from the configuration details in block 304 of the method 300 may also be provided, for example, on the managed systems service repository on the primary IHS. The configuration data may include information such as, for example, how a storage is to be configured, how many storage LUNs are required for each virtual host including the LUNs required for VMs, how many VM containers will be created per host, what the default internet protocol (IP) addresses are for each storage array management port on the storage, what the IP addresses are of remote access controllers on each IHS in the virtualization system, which IHS is designated the primary IHS, and/or a variety of other information that may be used to provide automated setup of the virtualization system.

The method 300 then proceeds to block 312 where the first boot processes of the operating systems provided on the primary and at least one secondary IHSs are modified to provide for virtualization configuration. The default first boot process for the primary IHS operating system is modified to create a primary IHS boot process that is operable to invoke the application interface and activate the at least one secondary IHS, described in further detail below. The default first boot process for the secondary IHS operating system is modified to create a secondary IHS boot process that is operable to configure the virtualization software, described in further detail below. In an embodiment, the method 300 describes a factory build process that, after block 312, results in the provision to the customer 206 of the virtualization system described above including the physical IHSs (i.e., the primary and at least one secondary IHSs) as configured above, the storage, networking equipment, and/or a variety of other virtualization system components that may be needed for virtualization system.

Figure 4A:
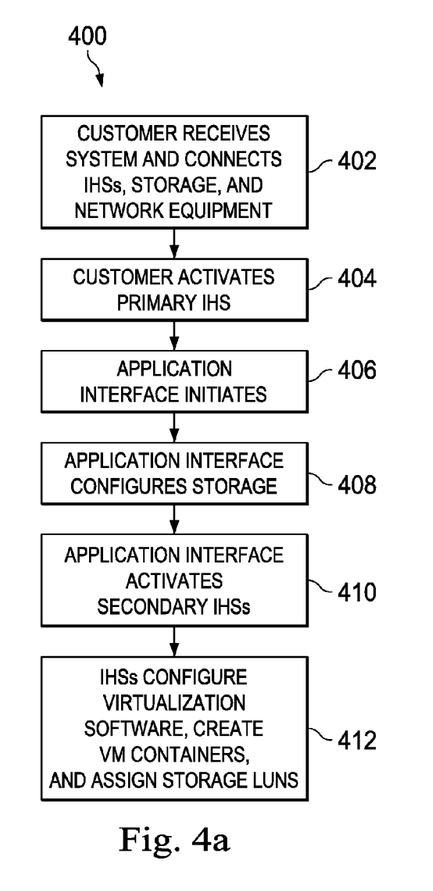
FIG. 4a is a flow chart illustrating an embodiment of a method for providing a virtualization system.
Figure 4B:
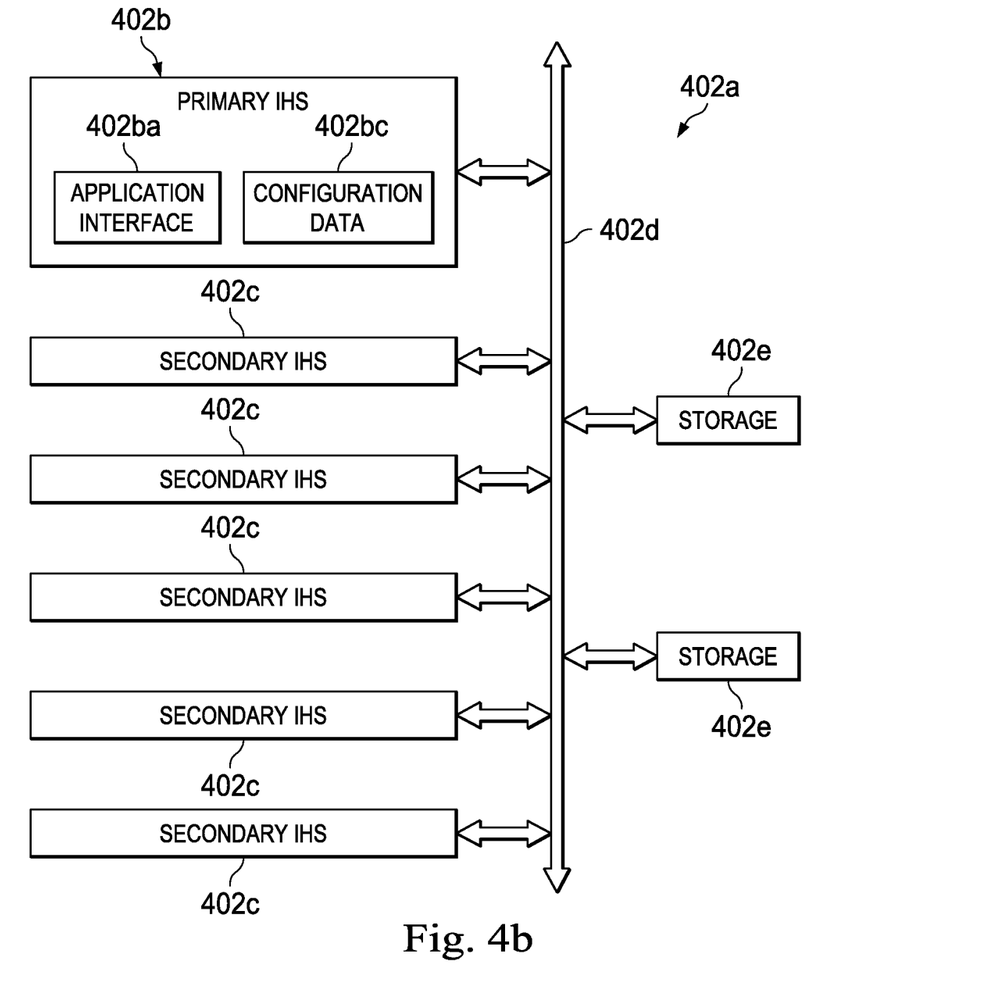
FIG. 4b is a schematic view illustrating an embodiment of a virtualization system.

Referring now to FIGS. 4a and 4b, a method 400 for providing a virtualization system is illustrated. The method 400 may be performed subsequent to the method 300. The method 400 begins at block 402 where a customer receives a virtualization system such as, for example, the virtualization system created using the method 300, and connects the plurality of physical IHSs, the storage, network equipment, and/or any other virtualization components that may provide the physical connections that allow the virtualization system to operate. FIG. 4b illustrates an embodiment of a virtualization system 402a after block 402 of the method 400. While the remainder of the method 400 will be described with reference to the virtualization system 402a, one of skill in the art will recognize the variety of virtualization systems that fall within the scope of the present disclosure. In an embodiment, the virtualization system 402a may be provided to the customer 206 with instructions on how to physically connect the components of the virtualization system 402a. The virtualization system 402a includes a primary IHS 402b having an application interface 402ba and configuration data 402bc. A plurality of secondary IHSs 402c are coupled to the primary IHS 402b through networking equipment 402d. A plurality of storage 402e are coupled to the primary IHS 402b and the secondary IHSs 402c through the networking equipment 402d. In an embodiment, the plurality of storage 402e may be referred to as a storage array and, in an embodiment, the virtualization system 402a may include a plurality of storage arrays.

Referring now to FIGS. 4a and 4b, the method 400 proceeds to block 404 where the customer activates the primary IHS. In an embodiment, the virtualization system 402a may be provided to the customer 206 with instructions to activate the primary IHS 402b upon connecting the components of the virtualization system 402a. Subsequent to connecting the physical connections for the virtualization system 402a, the customer 206 activates (e.g., powers on) the primary IHS 402b. The method 400 then proceeds to block 406 where the application interface initiates. In response to the activation of the primary IHS 402b, the primary IHS 402b boots using the primary IHS first boot process created in block 312 of the method 300. The primary IHS boot process includes computer-executable instructions that cause the primary IHS 402b to initiate the application interface 402ba. The method 400 then proceeds to block 408 where the application interface configures the storage. The application interface 402ba includes computer-executable instructions that, upon application interface initiation, cause the primary IHS 402b to access the configuration data 402bc on the primary IHS 402b and use that configuration data 402bc to configure the storage 402e. In an embodiment, configuration of the storage 402e includes, for example, creating LUNs for the storage 402e and/or a variety of other storage configuration actions known in the art. In an embodiment, the primary IHS 402*b* may configure the storage 402*e* though, for example, the networking equipment 402*d* using storage management port default IP addresses that are located in the configuration data 402*bc* in order to access storage management ports in the storage 402*e*. The method 400 then proceeds to block 410 where the application interface 402*ba* activates the secondary IHSs. In an embodiment, the application interface 402*ba* includes computer-executable instructions that cause the primary IHS 402*b* to activate (e.g., power on) the secondary IHSs 402*c*. In an embodiment, the application interface 402*ba* activates the secondary IHSs 402*c* using remote access controller default IP addresses that are located in the configuration data 402*bc* to access remote access controllers located in the secondary IHSs 402*c*.

The method 400 then proceeds to block 412 where the IHSs configure virtualization software, create VM containers, and assign storage LUNs. In an embodiment, in response to the activation of the secondary IHSs 402*c*, the secondary IHSs 402*c* boots using the secondary IHS first boot process created in block 312 of the method 300. The secondary IHS boot process includes computer-executable instructions that cause the secondary IHSs 402*c* to configure virtualization software that was provided on the secondary IHSs 402*s*, for example, in block 308 of the method 300. In an embodiment, the configuration of the virtualization software includes creating VM containers on the secondary IHSs 402*c*, mapping the VM containers to the storage LUNs, and/or a variety of other virtualization activities known in the art. In an embodiment, the primary IHS boot process includes computer-executable instructions that cause the primary IHS 402*b* to configure virtualization software that was provided on the primary IHS 402*b*, for example, in block 308 of the method 300. In an embodiment, the configuration of the virtualization software includes creating VM containers on the primary IHS 402*b*, mapping the VM containers to the storage LUNs, and/or a variety of other virtualization activities known in the art. In an embodiment, upon completion of the method 400, the virtualization system 402*a* is ready for the customer 206 to use. Thus, systems and methods are provided that greatly simply the ordering and configuration of a virtualization system by providing a virtualization system that simply requires a customer to physically connect the virtualization system components and then activate a primary IHS in order to configure the entire system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtualization system, comprising:
   at least one storage;
   a plurality of information handling systems (IHSs) that are operable to be coupled to the storage, the plurality of IHSs comprising a primary IHS and at least one secondary IHS;
   a primary IHS non-transitory computer-readable medium located in the primary IHS, the primary IHS non-transitory computer-readable medium comprising:
   configuration data;
   an application interface; and
   a primary IHS operating system comprising a primary IHS first boot process;
   wherein, following receipt of the primary IHS, the at least one secondary IHS, and the at least one storage by a customer and physical connection of the primary IHS, the at least one secondary IHS, and the at least one storage together by the customer subsequent to the receipt, and in response to powering on of the primary IHS by the customer subsequent to the physical connection of the primary IHS, the at least one secondary IHS, and the at least one storage, the primary IHS first boot process on the primary IHS operating system is configured to automatically initiate the application interface and, in response, the application interface is configured to automatically power on the at least one secondary IHS and use the configuration data to automatically configure the at least one storage by automatically creating at least one storage element; and
   a secondary IHS non-transitory computer-readable medium located in the at least one secondary IHS, the secondary IHS non-transitory computer-readable medium comprising:
   virtualization software; and
   a secondary IHS operating system comprising a secondary IHS first boot process;
   wherein the secondary IHS first boot process is configured, in response to powering on of the at least one secondary IHS by the primary IHS, to automatically configure the virtualization software by automatically creating at least one virtual machine element and automatically associating the at least one virtual machine element with the at least one storage element.

2. The virtualization system of claim 1, wherein the configuration data comprises information on a number of storage logical unit numbers (LUNs) to be created for the at least one secondary IHS.

3. The system of claim 1, wherein the configuration data comprises information on a number of virtual machine (VM) containers that will be located on the at least one secondary IHS.

4. The system of claim 1, further comprising:
   a storage management port in the at least one storage.

5. The system of claim 4, wherein the configuration data comprises information on a default internet protocol (IP) address for the storage management port in the at least one storage.

6. The system of claim 1, further comprising:
   a remote access controller in the at least one secondary IHS.

7. The system of claim 6, wherein the configuration data comprises information on a default IP address for the remote access controller in the at least one secondary IHS.

8. A virtualization provider system, comprising:
   a communication system;
   a processing system coupled to the communication system; and
   a non-transitory memory coupled to the processing system and including instructions that, when executed by the processing system, cause the processing system to:
   receive a plurality of virtualization system requirements through the communication system from a customer, wherein the plurality of virtualization system requirements comprise a plurality of information handling system (IHS) requirements, at least one storage requirement, and a plurality of configuration details;

designate a primary IHS and at least one secondary IHS from the plurality of IHS requirements, and at least one storage from the at least one storage requirement;

provide configuration data related to the plurality of configuration details, an application interface, and a primary IHS operating system on the primary IHS such that, following receipt of the primary IHS, the at least one secondary IHS, and the at least one storage by the customer and physical connection of the primary IHS, the at least one secondary IHS, and the at least one storage together by the customer subsequent to the receipt, and in response to powering on of the primary IHS by the customer subsequent to the physical connection of the primary IHS, the at least one secondary IHS, and the at least one storage, a primary IHS first boot process on the primary IHS operating system is configured to automatically initiate the application interface and, in response, the application interface is configured to automatically power on the at least one secondary IHS and use the configuration data to automatically configure the at least one storage by automatically creating at least one storage element; and install, prior to the receipt by the customer, virtualization software and a secondary IHS operating system on the at least one secondary IHS, wherein the secondary IHS operating system comprises a secondary IHS first boot process that is configured, in response to powering on of the at least one secondary IHS by the primary IHS, to automatically configure the virtualization software by automatically creating at least one virtual machine element and automatically associating the at least one virtual machine element with the at least one storage element.

9. The virtualization provider system of claim 8, wherein the configuration data comprises information on a number of storage logical unit numbers (LUNs) to be created for the at least one secondary IHS.

10. The virtualization provider system of claim 8, wherein the configuration data comprises information on a number of virtual machine (VM) containers that will be located on the at least one secondary IHS.

11. The virtualization provider system of claim 8, wherein the at least one storage includes a storage management port.

12. The virtualization provider system of claim 11, wherein the configuration data comprises information on a default internet protocol (IP) address for the storage management port in the at least one storage.

13. The virtualization provider system of claim 8, wherein the at least one secondary IHS includes a remote access controller.

14. The virtualization provider system of claim 13, wherein the configuration data comprises information on a default IP address for the remote access controller in the at least one secondary IHS.

15. A virtualization provisioning network, comprising:
a network;
a customer system including at least one processor, wherein the customer system that his coupled to the network, operated by a customer, and configured to:
define a plurality of virtualization system requirements that include a plurality of information handling system (IHS) requirements, at least one storage requirement, and a plurality of configuration details; and
send the plurality of virtualization system requirements over the network; and a virtualization provider system including at least one processor, wherein the virtualization provider system is coupled to the network and configured to:
receive the plurality of virtualization system requirements from the customer system;
designate a primary IHS and at least one secondary IHS from the plurality of IHS requirements, and at least one storage from the at least one storage requirement;
provide configuration data related to the plurality of configuration details, an application interface, and a primary IHS operating system on the primary IHS such that, following receipt of the primary IHS, the at least one secondary IHS, and the at least one storage by the customer and physical connection of the primary IHS, the at least one secondary IHS, and the at least one storage together by the customer subsequent to the receipt, and in response to powering on of the primary IHS by the customer subsequent to the physical connection of the primary IHS, the at least one secondary IHS, and the at least one storage, a primary IHS first boot process on the primary IHS operating system is configured to automatically initiate the application interface and, in response, the application interface is configured to automatically power on the at least one secondary IHS and use the configuration data to automatically configure the at least one storage by automatically creating at least one storage element; and
install, prior to the receipt by the customer, virtualization software and a secondary IHS operating system on the at least one secondary IHS, wherein the secondary IHS operating system comprises a secondary IHS first boot process that is configured, in response to powering on of the at least one secondary IHS by the primary IHS, to automatically configure the virtualization software by automatically creating at least one virtual machine element and automatically associating the at least one virtual machine element with the at least one storage element.

16. The virtualization provisioning network of claim 15, wherein the customer system is configured to define the plurality of virtualization system requirements by:
communicating over the network with the virtualization provider system to receive a website that comprises at least one web page that is configured to receive the plurality of virtualization system requirements from the customer.

17. The virtualization provisioning network of claim 15, wherein the configuration data comprises information on a number of storage logical unit numbers (LUNs) to create for the at least one secondary IHS, a number of virtual machine (VM) containers that will be located on the at least one secondary IHS, a default internet protocol (IP) address for a storage management port in the at least one storage, and a default internet protocol (IP) address for a remote access controller in the at least one secondary IHS.

18. The virtualization provisioning network of claim 15, wherein the installing the primary IHS operating system further comprises the virtualization provider system:
modifying a default first boot process of the primary IHS operating system to create the primary IHS first boot process that is configured to automatically initiate the application interface following physical connection of the plurality of IHSs and the at least one storage and in response to powering on of the primary IHS.

19. The virtualization provisioning network of claim 15, wherein the installing the secondary IHS operating system further comprises virtualization provider system:
   modifying a default first boot process of the secondary IHS operating system to create the secondary IHS first boot process that is configured to automatically configure the virtualization software in response to powering on of the at least one secondary IHS.

20. The virtualization provisioning network of claim 15, wherein the virtualization provider system is configured to provide the primary IHS, the at least one secondary IHS, and the at least one storage to the customer along with instructions on how to physically connect the primary IHS, the at least one secondary IHS, and the at least one storage.

* * * * *